United States Patent [19]

Di Matteo et al.

[11] 4,441,854
[45] Apr. 10, 1984

[54] CONTROLLING POSITIONING SYSTEMS UPON REMOVAL OF POWER

[75] Inventors: Paul Di Matteo, Huntington; Joseph Ross, Fort Salonga, both of N.Y.

[73] Assignee: Robotic Vision Systems, Inc., Hauppauge, N.Y.

[21] Appl. No.: 290,237

[22] Filed: Aug. 5, 1981

[51] Int. Cl.³ .............................................. B65G 43/06
[52] U.S. Cl. .................................... 414/787; 212/149; 187/73; 414/685; 414/730; 188/382
[58] Field of Search ........................ 180/283, 275, 271; 212/149; 280/742, 737; 187/73, 77; 188/171, 382; 293/107, 110; 414/730, 1, 685, 787; 192/2

[56] References Cited

U.S. PATENT DOCUMENTS

| | | | |
|---|---|---|---|
| 3,247,930 | 4/1966 | Lagerman | 187/73 |
| 3,250,402 | 5/1966 | De Ligt | 188/171 X |
| 3,822,076 | 7/1974 | Mercier et al. | 293/107 |
| 4,132,292 | 1/1979 | Dufresne | 188/171 |
| 4,232,768 | 11/1980 | Dufresne | 188/171 X |

*Primary Examiner*—Robert J. Spar
*Assistant Examiner*—Terrance L. Siemens
*Attorney, Agent, or Firm*—Max Fogiel

[57] ABSTRACT

Damage to tools and/or equipment (such as measuring equipment) mounted on industrial robot systems or other positioning systems tending to drop when electrical power is cut off, is eliminated by auxiliary equipment which prevents such dropping.

1 Claim, 3 Drawing Figures

CONTROLLING POSITIONING SYSTEMS UPON REMOVAL OF POWER

BACKGROUND OF THE INVENTION

The present invention relates to positioning systems of the type which position tools and the like in predetermined orientation.

More particularly, the invention relates to industrial robot systems and tool (or equipment) positioning systems which normally position such tools or equipment in predetermined orientation.

Some of these robots or systems exhibit a tendency to lose their orientation, i.e. to simply "drop down" when electrical power to them is removed, either intentionally (e.g. end of shift) or accidentally (e.g. power outage). Tools or equipment (such as measurement devices) mounted on such robots or systems can be damaged as a result of such "dropping down", which can be a rather expensive process overall.

SUMMARY OF THE INVENTION

It is an object of the present invention to overcome the disadvantages of the prior art.

A more particular object of the invention is to avoid "dropping down" of robot and positioning systems when electrical power to them is removed.

Still more specifically, it is an object of the invention to avoid damage to tools and/or equipment (e.g. measuring equipment) as a result of the "dropping down" tendency of robots and positioning systems which are of the type where loss of electrical power inherently tends to cause such problems.

In keeping with these objects and with others which will become apparent hereafter, one feature of the invention resides in a system for preventing damage to one type of equipment in response to uncontrolled dropping of another thereto connected second type of equipment resulting from removal of electrical power to the second equipment, comprising means for detecting the power loss, and means for preventing the dropping of the second type of equipment.

The invention will hereafter be described with reference to exemplary embodiments as illustrated in the appended drawings. However, it is to be understood that this is by way of explanation only and not to be considered limiting of the invention as expressed in the claims hereto.

DESCRIPTION OF PREFERRED EMBODIMENTS

Figure 1:
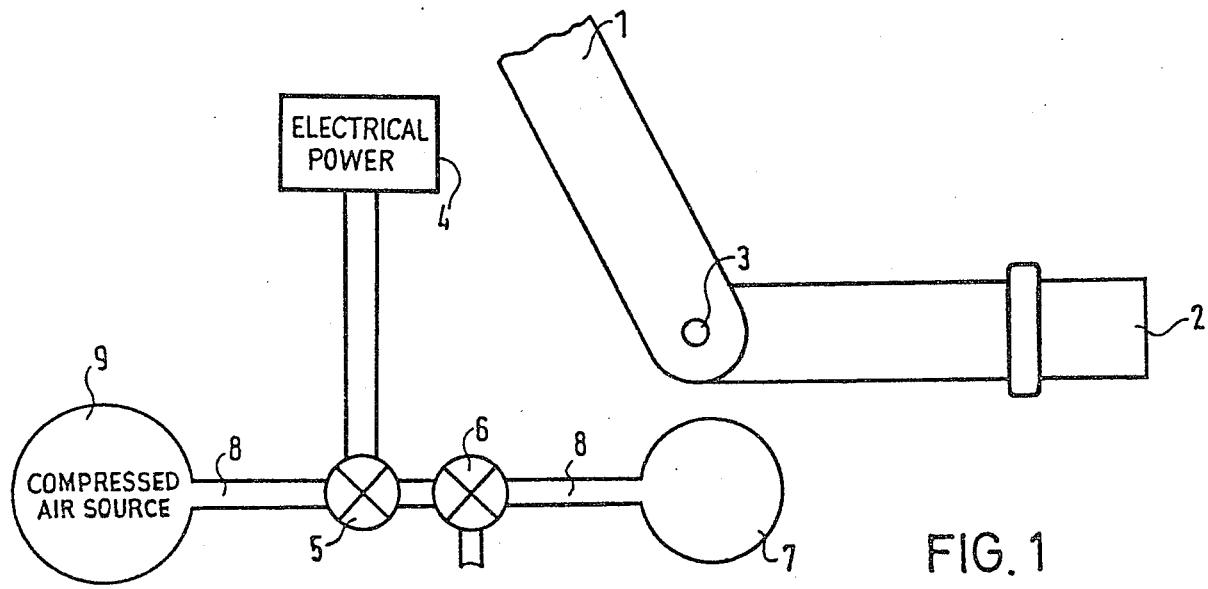
FIG. 1 is a diagrammatic side view, illustrating one embodiment of the invention.

The embodiment in FIG. 1 is particularly well suited for retrofitting of already existing equipment having a power-loss-related dropping problem, although it is not limited to such applications.

As shown in FIG. 1, tools (or equipment) 2 to be protected may be mounted on or to an industrial robot or positioning device 1, e.g. via a pivot hinge 3. It is assumed that the element 1 is of such nature that when electrical power to it is removed, it will drop and cause damage to equipment 2.

To avoid this, a source of compressed air (e.g. a tank) 9 which is not subject to pressure loss as a result of electrical power shutdown, is connected via air hose means 8 with an air bag 7 installed beneath the equipment 2 and/or the element 1. A spring-loaded solenoid valve 5 connected to the source of electrical power 4 is interposed in the hose means 8; when electrical power is lost, the spring opens the valve 5 so as to permit substantially instantaneous inflation of the air bag 7 (there may be more than one) from the source 9. This prevents "crashing" of the equipment 2, protecting the same against damage. A manual or electrical valve 6 interposed in the hose means 8 can be used to bleed air from the bag 7 and hose means when the system is operational, i.e. when it receives electrical power in the normal manner. Evidently, gases other than air, as well as liquids under pressure, may be used in the elements 7, 8 and 9.

Figure 2:
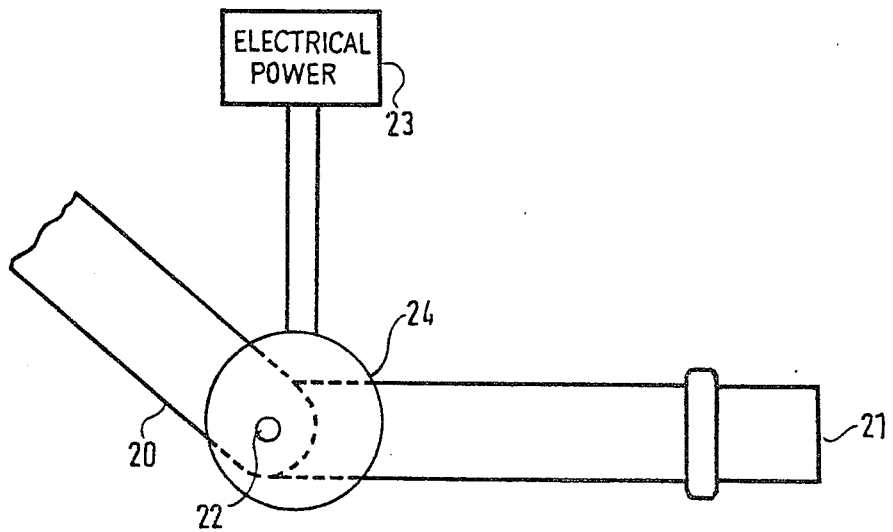
FIG. 2 is a diagrammatic detail view of another embodiment.

FIG. 2 shows another solution, in which again tools and/or equipment 21 are to be protected against damage due to drop-down of the robot or positioning system 20 in the event of electrical power loss. Elements 20 and 21 are connected at a pivot hinge 22, as before.

Here, a spring-loaded brake 24 (known per se) is used which is connected to the power source 23 and retained inactive thereby as long as electrical power flows to the robot 20 to hold the same in its intended position. The moment such power flow is interrupted, however, the spring-loading of the brake 24 will cause the brake to become immediately activated, locking the elements 20 and 21 in their respective positions and eliminating the crash problem.

Figure 3:
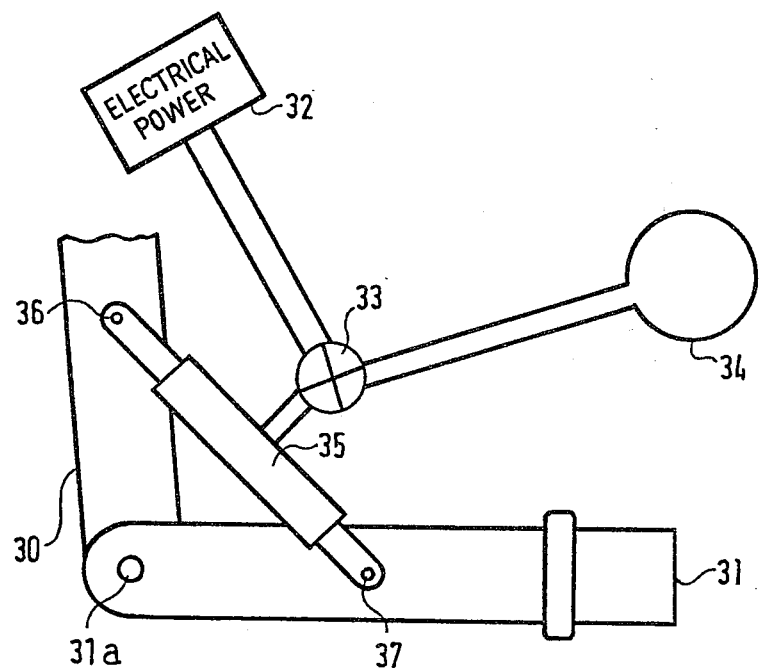
FIG. 3 is another diagrammatic side view, showing still a further embodiment of the invention.

According to still another embodiment, shown in FIG. 3, the robot system or positioning system is connected with the tools and/or equipment 31 to be protected, via another pivot hinge 31a. A spring-loaded solenoid valve 33 corresponds essentially to valve 5 of FIG. 1 and is connected to the power source 32; when electrical power from source 32 disappears, valve 33 will automatically open because of its spring-loading. The valve 33 is also connected with a source 34 of hydraulic or pneumatic fluid under pressure, and with a hydraulic or pneumatic cylinder and piston unit 35 which is articulated to the elements 30 and 31 at 36 and 37, respectively.

Loss of electrical power from the source 32 thus results in opening of the valve 33, which permits substantially instantaneous egress of hydraulic or pneumatic fluid from source 34 via valve 33 into the cylinder unit 35; the latter blocks any relative movement of elements 30 and 31 and avoids crash damage.

Still a further possibility is to use motor-driven lead screws having low-angle lead threads (i.e. self-locking threads), so that they cannot turn when the system is without electrical power.

The invention has hereinbefore been described with reference to specific embodiments as shown in the drawing. However, various changes and modifications will offer themselves to those skilled in the art and these are all intended to be comprehended within the scope of the appended claims.

We claim:

1. A system for preventing damage to one type of equipment in response to uncontrolled dropping of another theretoconnected second type of equipment resulting from removal of electrical power to the second equipment, comprising: means for detecting the power loss; and means for preventing the dropping of the second type of equipment; said detecting means comprising a spring-loaded solenoid valve; and the preventing means comprising inflatable bag means positioned to prevent dropping of the second equipment, a source of fluid under pressure, and conduit means connecting said bag means and source and having said solenoid valve interposed therein.

* * * * *